United States Patent
Hansen et al.

(10) Patent No.: US 11,853,534 B1
(45) Date of Patent: Dec. 26, 2023

(54) SYSTEM AND METHOD FOR DYNAMIC ACCESSIBILITY APP EXPERIENCES

(71) Applicant: UIPCO, LLC, San Antonio, TX (US)

(72) Inventors: Gregory David Hansen, Fuquay Varina, NC (US); Edward Manuel Alonzo, III, San Antonio, TX (US); Manfred Amann, San Antonio, TX (US); Donnette L Moncrief Brown, San Antonio, TX (US); Justin Dax Haslam, San Antonio, TX (US); Ashley Raine Philbrick, San Antonio, TX (US); Oscar Guerra, San Antonio, TX (US); Andre Rene Buentello, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/807,982

(22) Filed: Jun. 21, 2022

Related U.S. Application Data

(60) Provisional application No. 63/213,239, filed on Jun. 22, 2021.

(51) Int. Cl.
*G06F 3/0484* (2022.01)
*G06V 40/16* (2022.01)
*G06F 3/0481* (2022.01)
*G06F 3/16* (2006.01)
*G06F 3/0488* (2022.01)

(52) U.S. Cl.
CPC .......... *G06F 3/0484* (2013.01); *G06F 3/0481* (2013.01); *G06F 3/0488* (2013.01); *G06F 3/165* (2013.01); *G06V 40/166* (2022.01)

(58) Field of Classification Search
CPC .... G06F 3/0484; G06F 3/0481; G06F 3/0488; G06F 3/165; G06V 40/166
See application file for complete search history.

(56) References Cited

U.S. PATENT DOCUMENTS

| | | | |
|---|---|---|---|
| 9,883,831 B1* | 2/2018 | Stewart | A61B 5/4088 |
| 2013/0246904 A1* | 9/2013 | Seliger | G06F 3/0481 |
| | | | 715/234 |
| 2014/0356848 A1* | 12/2014 | Peterson | G09B 21/008 |
| | | | 434/428 |
| 2017/0173262 A1* | 6/2017 | Veltz | G16H 20/17 |

* cited by examiner

*Primary Examiner* — Pei Yong Weng
(74) *Attorney, Agent, or Firm* — Plumsea Law Group, LLC

(57) ABSTRACT

A method and system of providing users with accessibility tools based on the user's behavior during their access of an application. The system identifies behavior that is potentially associated with a particular disability. In response, the system causes one or more accessibility tools configured to improve the application experience for users with the identified disability to be enabled. In addition, past in-app behavior of a user may be used to determine whether an accessibility tool should again be offered to the same user during subsequent application use.

20 Claims, 11 Drawing Sheets

SYSTEM AND METHOD FOR DYNAMIC ACCESSIBILITY APP EXPERIENCES

CROSS-REFERENCE TO RELATED APPLICATION

This application claims the benefit of U.S. Provisional Patent Application Ser. No. 63/213,239 filed on Jun. 22, 2021 and titled "System and Method for Dynamic Accessibility App Experiences", the disclosure of which is incorporated by reference in its entirety.

TECHNICAL FIELD

The embodiments relate generally to methods and systems for modifying settings of a software application for a user, and specifically to adjusting the accessibility settings for the software application and/or computing device based on the user's determined needs.

BACKGROUND

User interfaces for APIs (application programming interfaces) can be used to facilitate an end user's interaction with, for example, a distributed computing environment (e.g., a web-based application), or an application residing wholly on a single computer system (e.g., a stand-alone application). Some interfaces, such as those used in the commercial or business enterprise context, have a layout of objects and widgets that is common to all versions of the interface. For example, two users will find the presentation experience of the interface to be the same. This uniform layout of objects and widgets is typical, although it does not usually serve as the most efficient layout for a particular end-user's purposes.

Although there have been various methods developed by electronic content providers to enhance the user's online experience, users have not been provided with personalized interfaces based on patterns of the individual's behavior and needs.

There is a need in the art for a system and method that addresses the shortcomings discussed above.

SUMMARY

In one aspect, a method for automatically enabling accessibility tools during use of an application in response to device data is disclosed. The method includes a first step of receiving, during an application usage session, at least first input data from a first computing device, and a second step of detecting a first usage pattern in the first input data. In addition, the method includes a third step of determining the first usage pattern is associated with a first disability type, as well as a fourth step of automatically causing, during the application access session, a first accessibility tool configured to assist users with the first disability type to be enabled for the application.

In another aspect, a method of automatically providing an appropriate accessibility tool to a user of an application is disclosed. The method includes a first step of obtaining at a first time, during an application usage session, at least first input data from a first computing device associated with a first user account. A second step includes determining the first input data includes use of a first accessibility tool during access of a first content via the application, and a third step includes receiving, at a second time subsequent to the first time, a request to access the application from a second computing device associated with the first user account. In addition, the method includes a fourth step of automatically enabling a second accessibility tool when the first content is again selected.

In another aspect, a system is disclosed for adjusting a configuration of an application in response to device data. The system comprises a processor and machine-readable media including instructions which, when executed by the processor, cause the processor to receive, during an application usage session, at least first input data from a first computing device. The instructions further cause the processor to detect a first usage pattern in the first input data. In addition, the instructions cause the processor to determine the first usage pattern is associated with a first disability type, and automatically cause, during the application access session, a first accessibility tool configured to assist users with the first disability type to be enabled for the application.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1A:
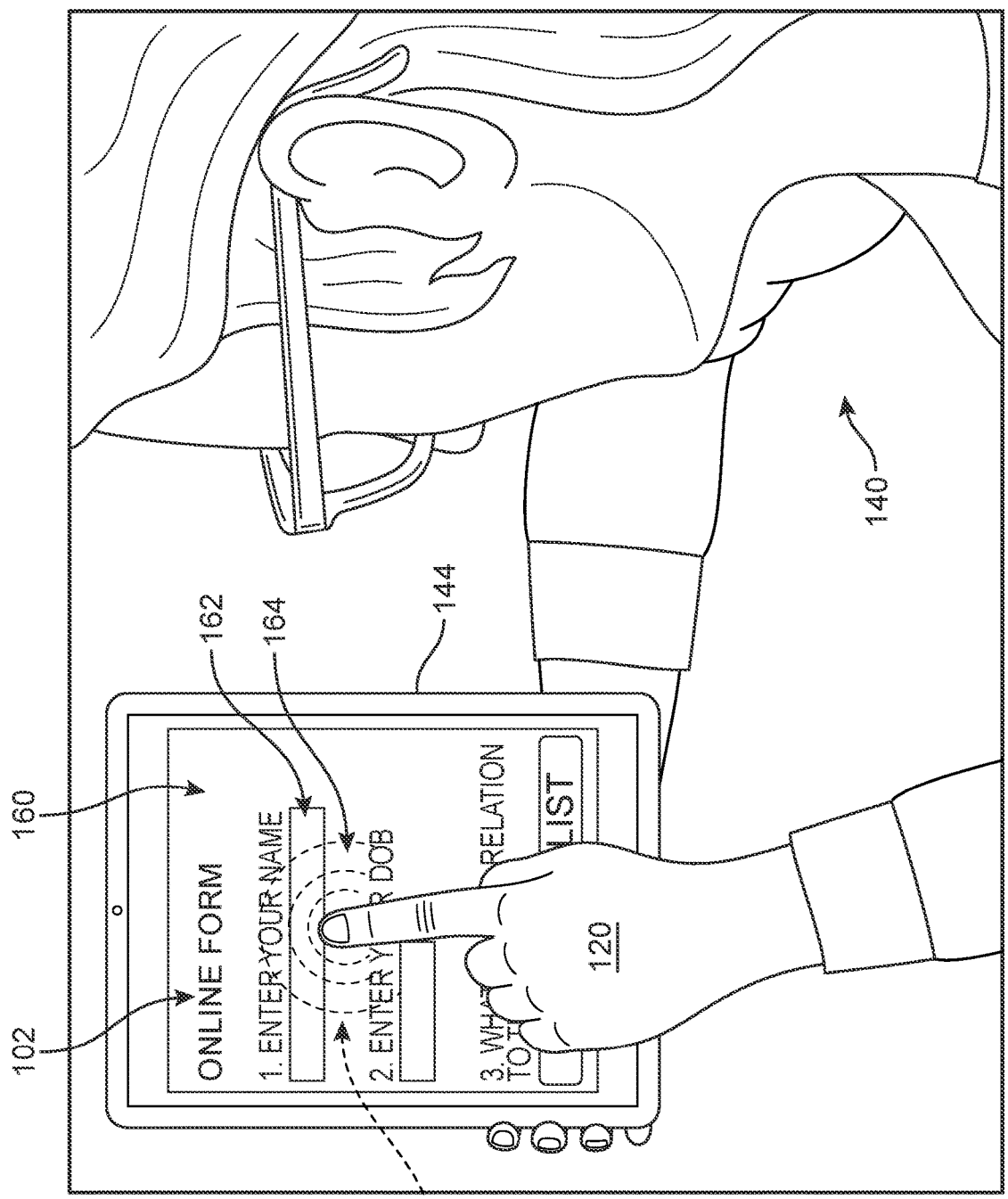
FIGS. 1A and 1B are an illustration of an example of a first user with visual impairment accessing an app and the app automatically enabling an accessibility tool, according to an embodiment.

The embodiments provide a system and method for determining a person's particular needs for a software application ("app") and automatically providing accessibility tools based on the user's identified needs or impairments. The proposed system and method can thereby provide an application interaction experience aligned with a user's accessibility requirements without requiring manual input from the user. In one example, the appearance of the application can be modified to be brighter and/or magnified for visually impaired users. In another example, the audio or closed captioning settings for the app can be modified in response to the user's auditory needs. In some embodiments, the app can adjust the color contrast in response to a user's color blindness. In different embodiments, passive behavior by the user can cause dynamic changes in the presentation of the user interface. The system is configured to monitor a user's behavior and determine if the user has a possible disability. In response to that determination, the system can adjust the app experience based on the particular disability identified. In other words, simply by engaging in their normal day-to-day in-app activities, the user's UI experience can be customized to better serve each user's needs.

Websites and apps often have text that is difficult to read, controls that are difficult to click, or audio and videos that are difficult to hear. It is essential that such resources be accessible in order to provide equal access and equal opportunity to people with diverse abilities. Access to information and communications technologies, including the Web, is defined as a basic human right in the United Nations Convention on the Rights of Persons with Disabilities (UN CRPD). Accessibility supports social inclusion for people with disabilities as well as others, such as older people, children, people in rural areas, and people in developing countries. Accessible design improves overall user experience and satisfaction.

For purposes of this disclosure, accessibility refers to websites, tools, and technologies that are designed and developed so that people with disabilities can use them. More specifically, with accessible options, people can perceive, understand, navigate, and interact with the web. Web accessibility encompasses all disabilities that affect access to the Web, including auditory, cognitive, neurological, physical, speech, and visual disabilities. Web accessibility also benefits people without disabilities, for example, people using mobile phones, smart watches, smart TVs, and other devices with small screens, different input modes, etc., older people with changing abilities due to aging, people with "temporary disabilities" such as a broken arm or lost glasses, people with "situational limitations" such as in bright sunlight or in an environment where they cannot listen to audio, people using a slow Internet connection, or who have limited or expensive bandwidth. In some other cases, such persons may be able to perform broader functions that rely on gross motor control, but struggle with more nuanced functions that rely on fine motor control.

As will be discussed below, apps can be configured with a variety of settings to improve accessibility and allow a wider range of users to enjoy its features. Some non-limiting examples include text alternatives offering equivalents for non-text content, such as short equivalents for images, including icons, buttons, and graphics, description of data represented on charts, diagrams, and illustrations, brief descriptions of non-text content such as audio and video files, and labels for form controls, input, and other user interface components. Text alternatives convey the purpose of an image or function to provide an equivalent user experience. For example, an appropriate text alternative for a search button would be "search" rather than "magnifying lens". Text alternatives can be presented in a variety of ways: they can be read aloud for people who cannot see the screen and for people with reading difficulties, or enlarged to custom text sizes.

Similarly, people who cannot hear audio or see video need alternatives, such as text transcripts and captions for audio content, audio descriptions which are narrations to describe important visual details in a video, and sign language interpretation of audio content, including relevant auditory experiences. Accessible content can be correctly read aloud, enlarged, or adapted to meet the needs and preferences of different people. For instance, it can be presented using custom color combinations, text size, or other styling to facilitate reading. In addition, some people need more time than others to read and use the content. For example, some people require more time to type text, understand instructions, operate controls, or to otherwise complete tasks on a website.

As used herein, the term "user", "customer", and/or "member" should be understood to refer to any end-user or person accessing an application configured with some or all of the features described herein. In addition, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" or "triggering event" refers to an event (or specific sequence of events) associated with a particular input or use of an application via an interface, which can trigger a change in the display of the application.

Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In addition, graphical user interfaces (GUIs) can be used to present information to a user in the form of icons, graphics, or other types of interactive elements. Such interactive elements are generally associated with a particular action or command. A user typically has to supply an input to a computing system that is associated with the interactive elements presented on the graphical user interface to execute the particular action or command. As used herein, "interactive element" broadly includes a wide variety of graphical tools or components, such as graphical icons, graphical menus, graphical buttons, hyperlinks, images, and any other element which can be displayed on a graphical display and associated with or otherwise linked to an action or process that is to be performed upon activation of an interactive element.

Referring now to FIG. 1, for purposes of introduction, a first user 140 is shown with a first computing device ("first device") 144. The first user 140 is accessing a first app 160 via the first device 144. The first device 144 can include an electronics unit comprising a plurality of different components, such as a user interface component (e.g., a touchscreen display, keyboard, mouse, microphone, etc.), a sensor unit (including one or more cameras or other image-based sensors), a user interface module, a processor, and/or a communication module. In some embodiments, the first device 144 may also include a microphone and speaker. In this example, first device 144 is a computer tablet.

Furthermore, the first device 144 may include a system including one or more processors and memory. Memory may comprise a non-transitory computer readable medium. Instructions stored within memory may be executed by the one or more processors. The first device 144 may be configured to receive and analyze data from various sensors associated with sensors. In different examples, the sensors can include one or more of an image sensor such as a camera, a light sensor, a temperature sensor, an infrared sensor, a touchscreen sensor, a microphone, a speaker, among others. In some cases, the first device 144 may also include a navigation system equipped with a GPS receiver that can receive GPS information or other receivers capable of receiving global or local positioning information.

A communication module may allow the first device 144 to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In FIG. 1, the first user 140 is attempting to use first app 160 to input various responses to an online form (e.g., for a doctor's office, a school, a camp, etc.). In this encounter, as the first user 140 accesses the first app 160, first app 160 can monitor the user's behavior. For example, first app 160 can receive touchscreen data 110, which in this case is a repeating pattern of taps in a first region 164 of the interface for first app 160. The first region 164 can be understood to correspond to a non-input area, where no form responses may be entered (i.e., the space around the form questions and answer boxes). First user 140 repeatedly taps the first region 164 with finger 120 and this data 110 is shared with first app 160. This data 110 is used by the first app 160 to determine that first user 140 is actually attempting to tap or activate a second region 162, which comprises an input box for receiving responses to form questions.

Figure 1B:
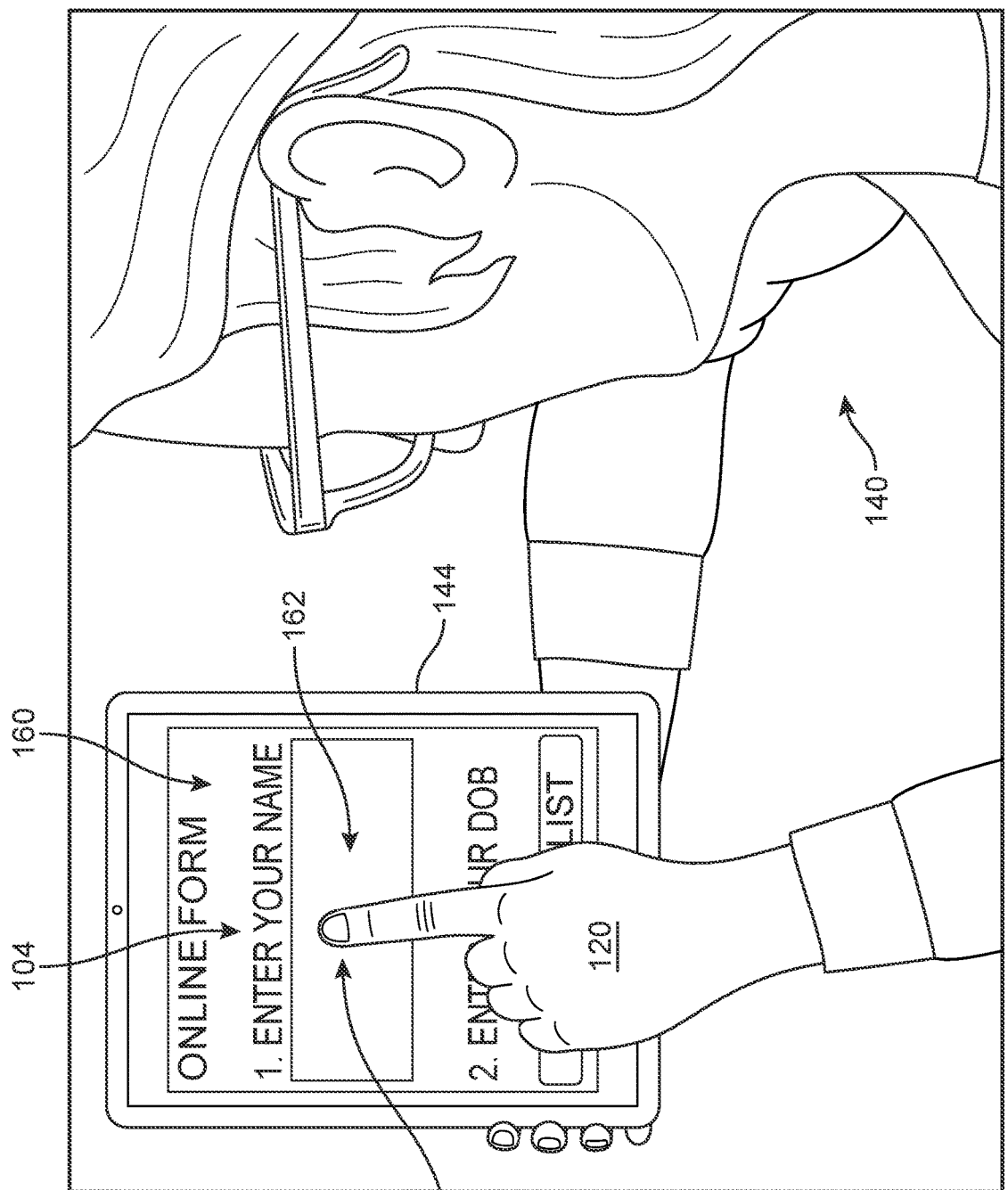

In response to this determination, the first app 160 may be configured to automatically magnify the interface display from a first magnification mode 102 (in FIG. 1A) to a second magnification mode 104 (in FIG. 1B). In one embodiment, this may occur without any messaging. In some other cases, a message such as a first audio message 148 (e.g., "Looks like you're having trouble. Intake App will automatically magnify the screen for you."), for example via a speaker 146 for first device 144, may be provided, as shown in FIG. 1A. In another example, the app can first ask the user if he or she permits the app to make the change, for example using voice input.

In FIG. 1B, the second magnification mode 104 significantly enlarges the online form size, and more particularly the size of the input box in second region 162. Now when the first user 144 taps the screen, she is easily able to contact the intended second region 162. In some embodiments, the first app 160, having determined that this user may be a person with a disability, can offer additional help options. For example, a message such as a second audio message 112 ("If you would like further assistance, please triple-tap the screen at any time") can allow the user to receive additional accessibility options. In different embodiments, the system can automatically apply an accessibility mode in response on a determined likelihood that the user is a person with a disability that is based on a pattern of in-app activity or other sensor data. Thus, without further action by first user 140, an app can be configured to alter its appearance or adjust other settings to better support the user's ability to interact with the app.

Figure 2:
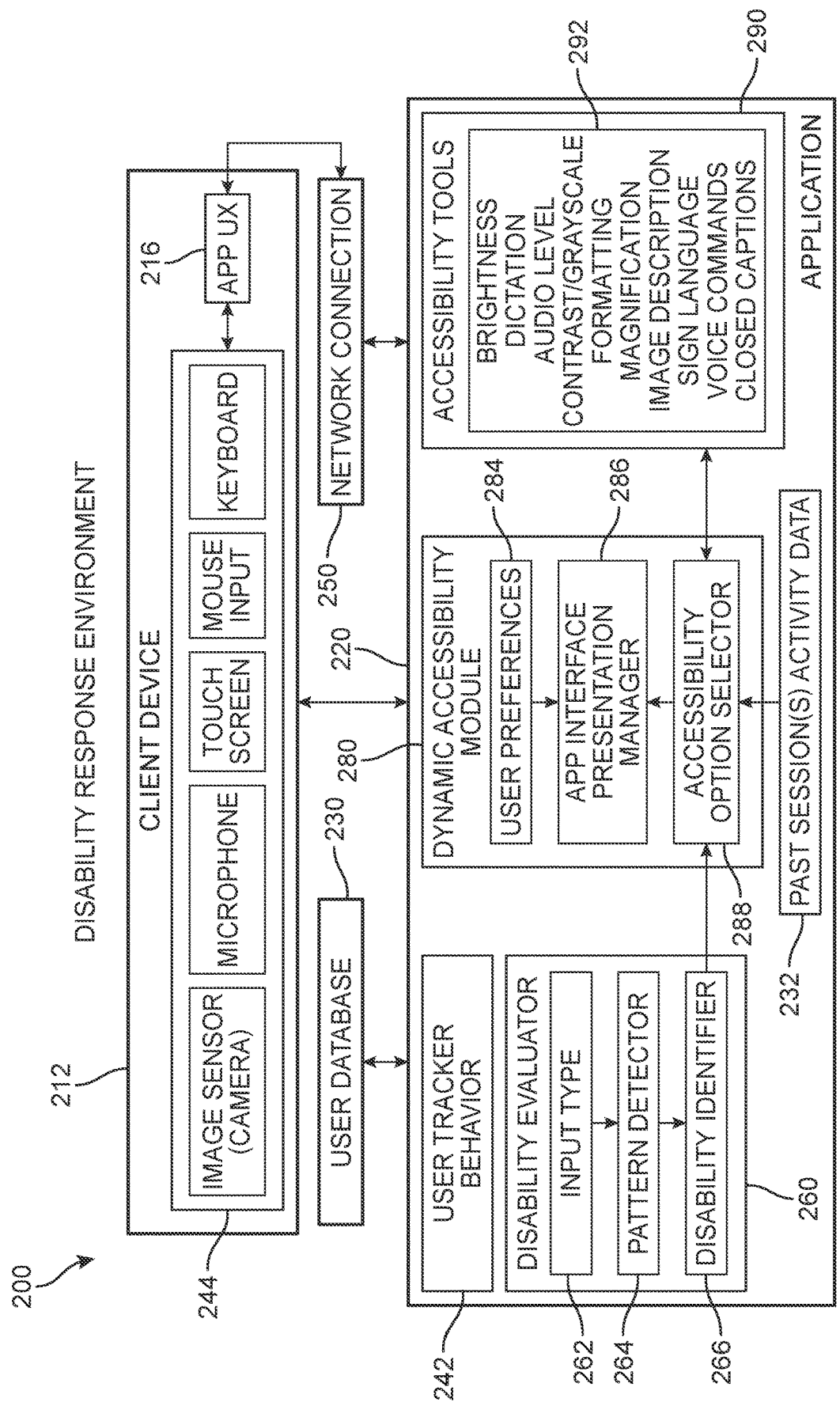
FIG. 2 is a schematic diagram of a system for automatically and dynamically enabling the implementation of accessibility tools based on a user's estimated disability, according to an embodiment.

In order to provide the reader with a greater appreciation of the embodiments, FIG. 2 depicts an overview of an embodiment of a user disability response environment ("environment") 200 in which a user's activity while interacting with an app 220 is monitored and used to determine which app accessibility options should be applied or offered. In addition, in some embodiments, the environment 200 and/or application ("app") 220 includes an intelligent user experience system ("intelligent system") 290 configured to provide customized instructions to app 220 in order to learn, improve, and cause to present the most appropriate accessibility mode to the user.

As shown in FIG. 2, the environment 200 includes a client computing device ("client device") 212 configured to communicate with an application ("app") 220 over a network connection 250. While the various components of environment 200 are shown as being accessed through a cloud network and/or stored on a cloud-based server in FIG. 2, in other embodiments some or all components described herein can reside in client device 212 and/or a remote server. In other words, the user may interact with app 220 locally, with or without a network connection, including the features and functionality of a dynamic accessibility module 280, described in detail below.

In different embodiments, the client device 212 includes a visual output (display) and audio output (speaker) components that can present information and media for the app 220. As noted above, in some embodiments, app 220 can represent a product/service support software that is associated with a provider of the product/service of interest to a customer or other user. However, in other embodiments, the app can refer to any instance of software running on client device 212. In some cases, the user can receive and send information through a user interface ("App UX") 216 that may be presented on the device. The user interface may refer to an operating system user interface or the interface of one or more software applications that may run on the client device 212, such as app 220.

In different embodiments, the user may, desiring the services or features provided by app 220, access app 220 via client device 212. As one non-limiting example, the app 220 can represent an interactive platform that provides a site from which the customer can create and maintain an account, access information and options related to the entity and its products or services, perform various tasks, review and/or modify their account details, and/or communicate with personnel of the app-providing entity. In other embodiments, the app can represent any software application or website being accessed by the user. As shown in FIG. 2A, the user can enter various inputs via client device 212 that are received by an input processor of the app 220. In some embodiments, the app 220 will generate a log of these inputs and selections for a given microlocation using an app user behavior tracker ("tracker") 242. For example, the tracker 242 can be configured to automatically transfer user preferences, selections, and/or in-app activity data in real or near real-time to a user database ("database") 230 for storage. As will be discussed below, in some embodiments, a disability evaluator intelligent system 290 may monitor ongoing session data and/or past session data to identify patterns in user in-app behavior.

As shown in FIG. 2, the app 220 is configured to receive sensor and/or input data about the user's behavior while using app 220. This input data 244 can encompass one or more of image data (via a camera), audio data (via a microphone), touchscreen data, mouse input data, keyboard input data, and other data that may be collected via sensor and input components associated with client device 212. In addition, any (intentional) user preferences regarding the accessibility settings for the App UX 216 will also be received by input processor for storage in database 230. In some embodiments, the manually entered user preferences will override any automated recommendations for modifying the accessibility mode of the app. For example, in some embodiments, user feedback and/or user selections about the appearance of the app during or after a session can determine the accessibility tools that will be provided for some or all of the subsequent access sessions by that user.

In different embodiments, when initiating an app session or during the app session, a dynamic accessibility module ("accessibility module") 280 can be configured to automatically implement or apply an accessibility setting that has a high probability or likelihood of best corresponding to the user's needs for that particular interface. For example, when the app 220 receives a login request, the app 220 may begin monitoring user behavior via user behavior tracker 242 and/or obtain input data 244 via one or more input devices associated with the client device 212. The input data 244 is processed by a disability evaluator module 260 to extract specific events that are known to correspond to a particular disability. These events are classified by an input type classifier 262. As some non-limiting examples, input type classification labels can include repetitive and/or apparent random clicks or taps, touchscreen inputs that are associated with bodily tremors or trembling of the hands (e.g., Parkinson's patients), repeated spelling or other mistakes, repeated incorrect input (e.g., passwords, PINs, security question responses, etc.), repeated "undo", "redo", "rewind", or "back" function usage, selections that indicate an inability to distinguish certain color(s), more-than-average time needed to complete an in-app task or review in-app information, detection of squinting, detection of user face moving farther away or closer than average (i.e., as the user moves the screen further or closer to compensate for poor vision such as nearsightedness or farsightedness) in an image of the user, etc. Furthermore, a pattern detector 264 is configured to review the incoming input data and determine if there is a pattern of behavior. This information is then shared with a disability identifier model 266 to identify if there is sufficient basis for recognizing a possible disability for the user and, if so, selecting the disability from a disability listing. The disability identifier model 266 is trained using data from both normal users and persons with disabilities in sites and apps that do not include any accessibility features.

In one embodiment, processing algorithms can perform compression, artifact correction, noise reduction, color corrections, geometric corrections, imager non-uniformity correction, etc., and various processing enhancement operations on the image, audio, and other content captured by input sensors of the client device 212. The image processing algorithms are numerical and symbolic algorithms for the manipulation of, for example, images and video streams captured by the device camera. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms. Image processing may also include machine learning techniques that can be used to discriminate between features and to identify objects, for example via image recognition and object detection software.

Such techniques may also include, but are not limited to, machine vision algorithms that perform object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD. Thus, disability evaluator model 260 is configured to detect and classify one or more visual, audio, or other data objects in the input data 242. This classification is then sent to an accessibility option selector 288 of dynamic accessibility module 280.

While some embodiments describe an automatic disability assessment and accessibility response by the app 220, it should be understood that a user's selection of specific accessibility options will override the system selected options. In other words, if a user has manually entered their accessibility preferences 284, which can be stored in database 230, these accessibility settings will be applied by an app interface presentation manager 286, rather than those suggested by the system. Furthermore, previous accessibility selections during their use of the app 220 may be stored as past session(s) activity data 232, and in some embodiments, can be referenced to determine which accessibility tools should now be implemented by accessibility option selector 288. In other embodiments, it may be appreciated that no preferences or past accessibility data for a user are available. For example, the user may be using a particular feature of the app for the first time or only recently experienced an event that has led to a disability.

In different embodiments, the accessibility option selector 288 will receive the disability identification and request one or more accessibility tools 292 from a tool repository 290 for implementation by app interface presentation manager 286. As some non-limiting examples, such tools 292 can include adjustment of display brightness, activation of a dictation tool, increasing audio, applying a higher level of contrast or switching to grayscale, modifying the formatting of text, enlarging text and images and other display elements, changing colors and fonts of text, providing text-to-speech functionality, providing a speech-based image description, allowing the user to perform sign language to provide inputs, offering a sign language video, turning on closed captioning or offering a transcript of audio, offering reading assistance, using symbols rather than text, and other such tools that may be configurable by app components.

Thus, the accessibility option selector 288 uses the repository 290 to select the appropriate app layout and settings that match, align with, and/or is best configured to accommodate a possible disability of the user and allow the user to experience the app in a manner more conducive to their ability. Some possible responses can include activating a dictaphone-type service when the user makes repeated spelling mistakes and/or is deleting and re-typing multiple times. In another example, mouse clicks in non-clickable regions or clicks followed by an undo-type function can trigger a magnification of the display and/or an increase in brightness or a pause in the input mode (i.e., ignoring additional mouse clicks or taps to prevent undesirable results until the issue is resolved with an appropriate accessibility option). In some cases, the detection of user squinting or moving the tablet away from their face (or very close) can cause the app to begin to read the text on the screen out loud. In yet another example, repeated playback of audio can cause the app to increase the volume or add closed captioning. In some cases, inappropriate user selections of elements or regions of the display that are a specific color range (hue) can cause the app to modify the contrast level or apply grayscale.

It should be understood that in other implementations, environment 200 can include additional or fewer modules or can include one or more additional computing devices or related server devices. The modules of environment 200 can be associated with the various local computing devices and, for example, can be disposed within the computing device. In alternative implementations, the modules of environment 200 can include independent computing devices that are coupled to, and in data communication with, the local computing devices. As used in this description, the term "module" is intended to include, but is not limited to, one or more computers, processing units, or devices configured to execute one or more software programs that include program code that causes a processing device(s) or unit(s) of the computer to execute one or more functions. Processing units can include one or more processors (e.g., microprocessors or central processing units (CPUs)), graphics processing units (GPUs), application specific integrated circuits (ASICs), or a combination of different processors.

In alternative embodiments, systems and modules can each include other computing resources/devices (e.g., cloud-based servers) that provide additional processing options for performing one or more of the machine learning determinations and calculations. The processing units or devices can further include one or more memory units or memory banks. In some implementations, the processing units execute programmed instructions stored in memory to cause system, devices, and modules to perform one or more functions described herein. The memory units/banks can include one or more non-transitory machine-readable storage mediums. The non-transitory machine-readable storage medium can include solid-state memory, magnetic disk, and optical disk, a random-access memory (RAM), a read-only memory (ROM), an erasable programmable read-only memory (e.g., EPROM, EEPROM, or Flash memory), or any other tangible medium capable of storing information.

Figure 3:
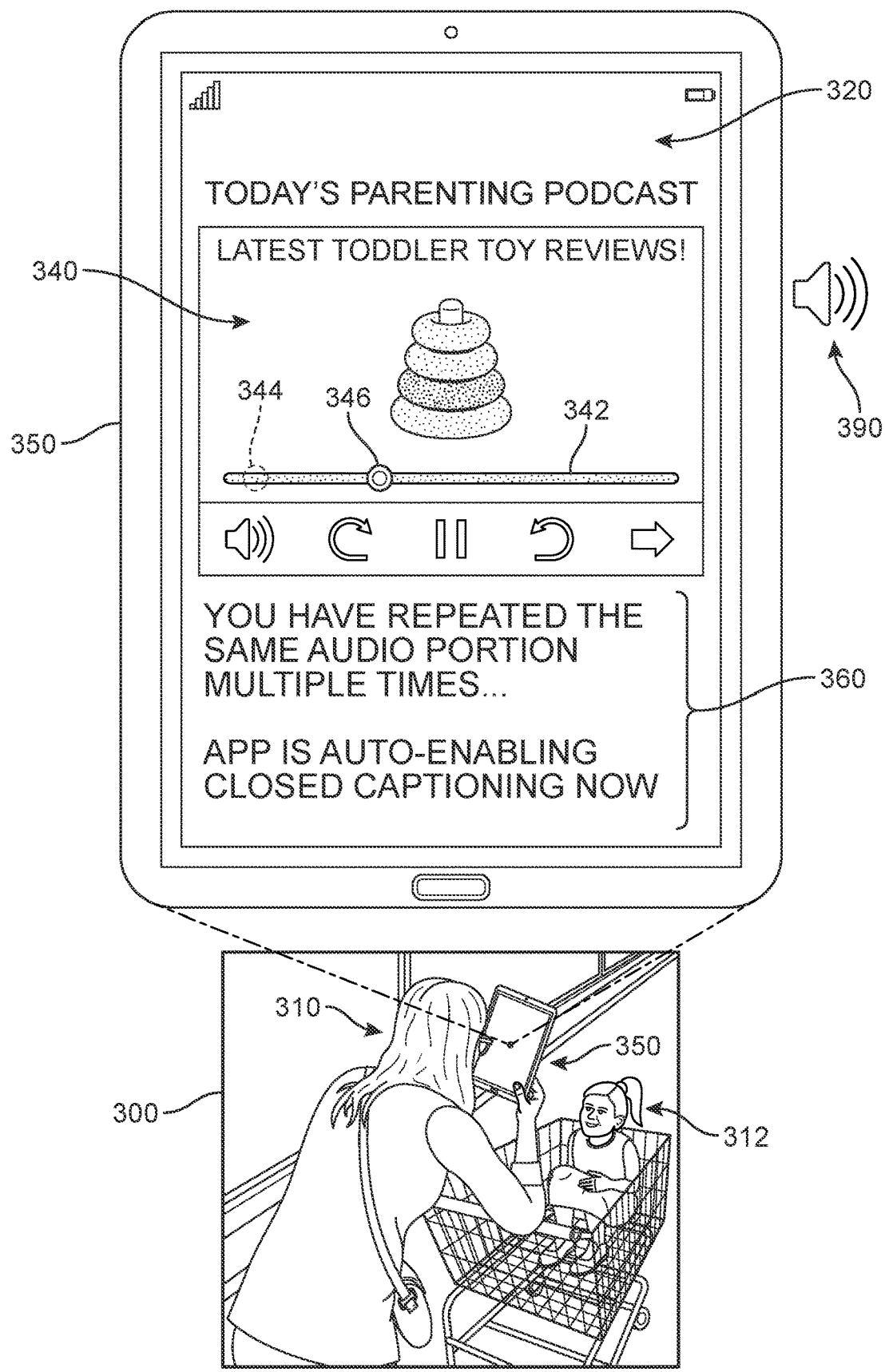
FIGS. 3 and 4 illustrate a sequence in which a second user who is unable to properly hear the audio emitted from their tablet is automatically provided with a closed captioning accessibility tool, according to an embodiment.
Figure 4:
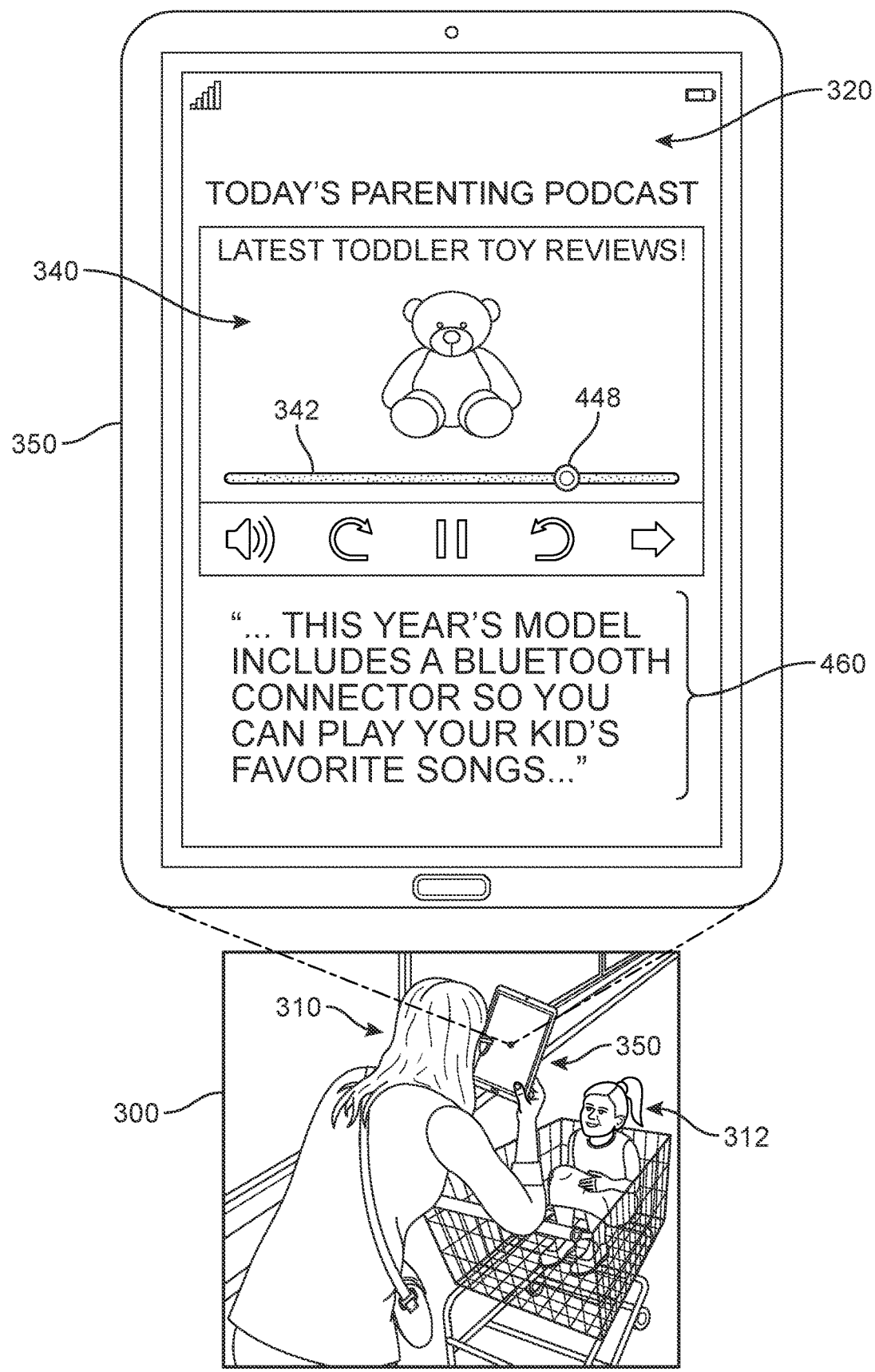

For purposes of illustration, some examples of scenarios in which embodiments of the proposed systems may be implemented are depicted in FIGS. 3-8B. In a first example, FIGS. 3 and 4 present a second user 310 walking through a retail store 300. Second user 310 is accessing an app 320 via a second computing device ("second device") 350, which in this case is a tablet. As the second user 310 moves through the store 300, which in this case is a toy store, she views parenting podcasts and videos via a second app 320 that are directed to her current interest, toddler toys. For example, she is listening to a podcast 340 ("Latest toddler toy reviews!") about potential toys she might purchase for her daughter 312 who is seated in the cart that second user 310 is pushing.

As second user 310 listens to the podcast 340, her daughter 312 sings a song and otherwise makes it difficult for the second user 310 to actually hear and understand the playback of the podcast 340. She repeats playback again and again of some or all of a segment of podcast 340, as reflected by the two markers (344, 346) on a status bar 342 (dotted lines showing approximately where she continues to restart the playback). The second app 320 receives this behavior as input data and determines that second user 310 may be hard of hearing or is otherwise unable to hear audio 390 corresponding to podcast 340. In response, the second app 320 selects the accessibility option that would most likely accommodate the second user's needs. In this case, the second app 320 initiates a closed captioning service for the podcast 340. An optional notification 360 ("You have repeated the same audio portion multiple times . . . App is auto-enabling closed captioning now") is displayed. In FIG. 4, the second user 310 is shown enjoying the content of podcast via closed captioning 460 (" . . . This year's model includes a Bluetooth connector so you can play your kid's favorite songs . . . ") displayed adjacent to the podcast controls. The status bar 342 shows a new marker 448 reflecting that she was able to progress further forward through the podcast 340. Thus, it can be appreciated that the proposed embodiments may be useful not just to those with physical disabilities, but those with environmental challenges.

Figure 5:
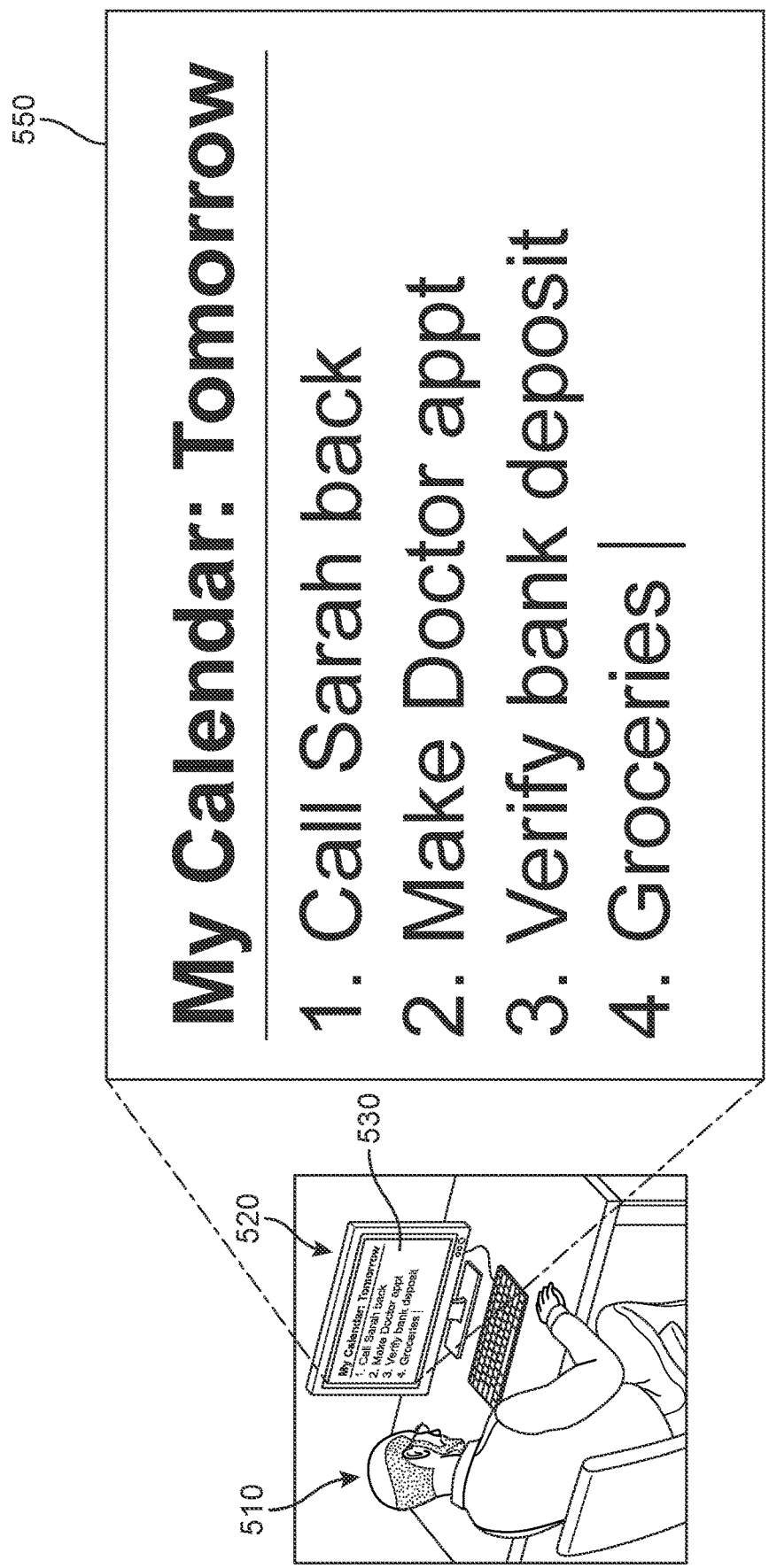
FIG. 5 is an illustration of a third user accessing an application from a desktop computer while applying a magnification-based accessibility tool, according to an embodiment.
Figure 6A:
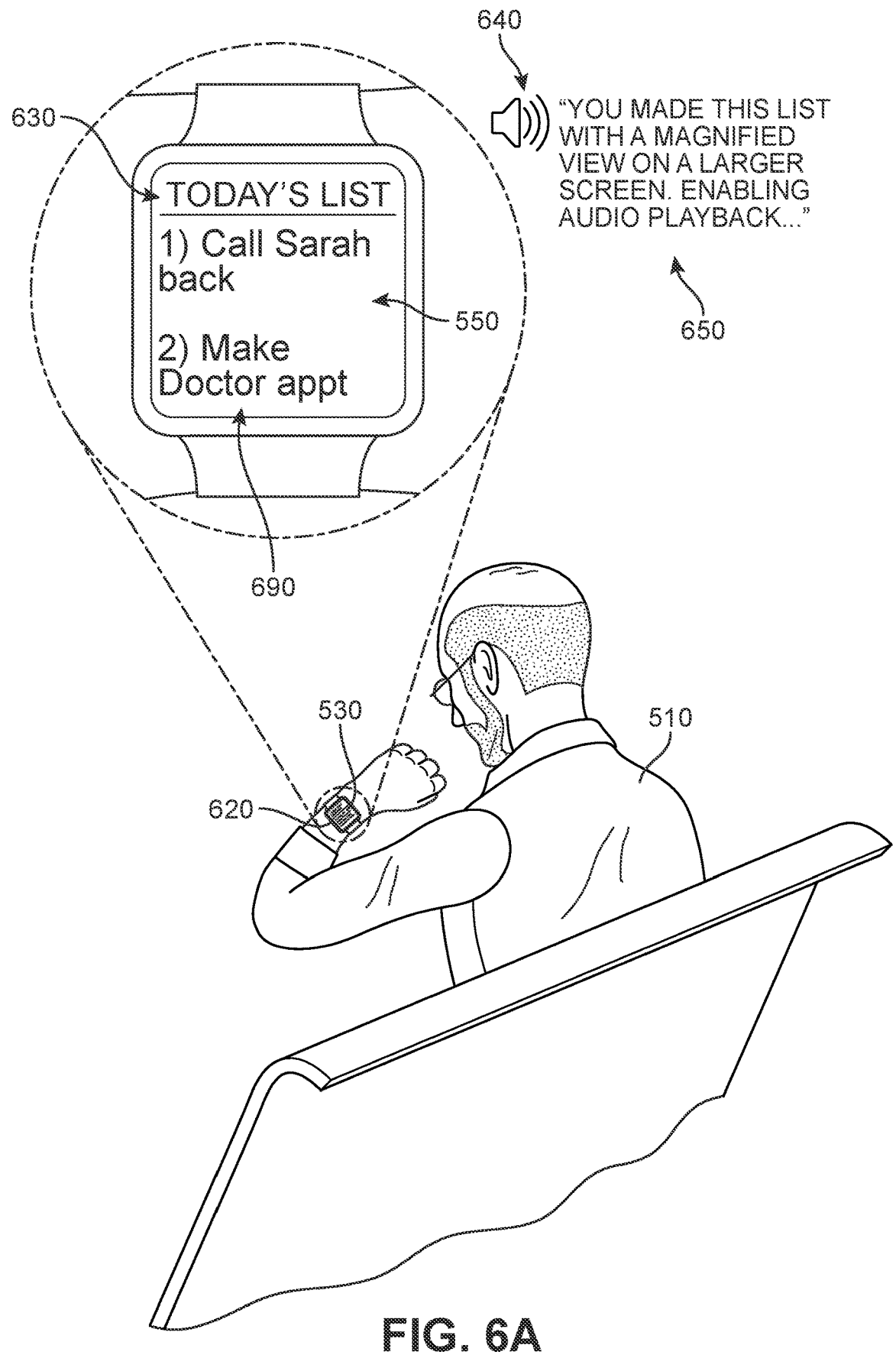
FIGS. 6A and 6B illustrate the third user subsequently accessing the application from a smartwatch and being automatically provided with an audio reading of the selected content, according to an embodiment.
Figure 6B:
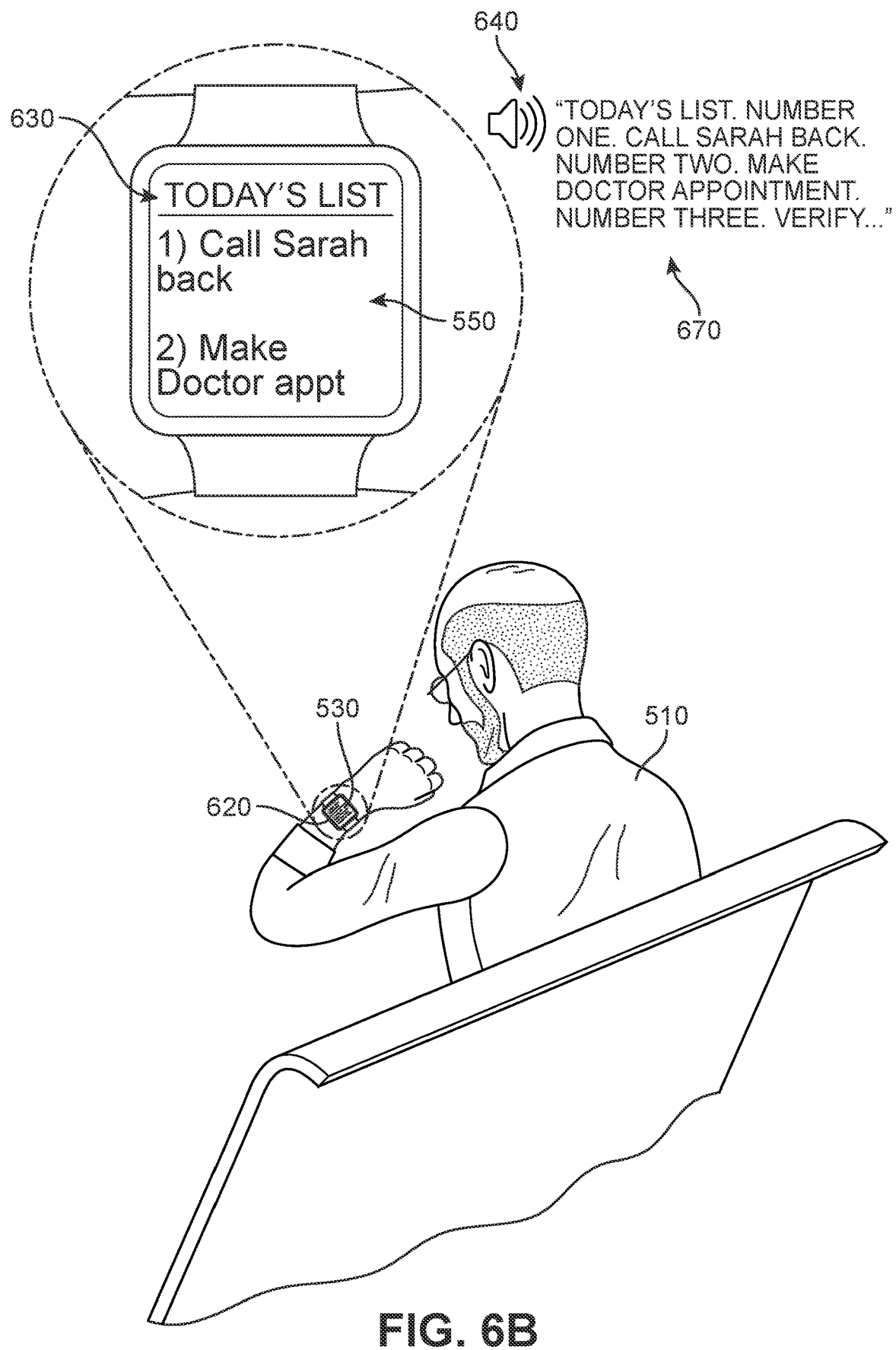

Another example of a scenario in which an embodiment of the proposed systems may be implemented is shown with reference to FIGS. 5-6B. A third user 510 is shown accessing a third app 530 via a third computing device ("third device") 520, which in this case is a desktop computer. Third user 510 is generating a calendar "to-do" list for himself via a calendar interface 550 available through third app 530. It can be seen that the third user 550 has enlarged the calendar interface 550 to magnify the text size for his viewing. Once the calendar has been created, the third user 510 ends his session.

In FIG. 6A, the third user 510 is shown on the following day, seated outside on a bench. The third user 510, wishing to review the to-do list, accesses third app 530 via a fourth computing device ("fourth device") 620, in this case a smartwatch. He opens the calendar interface 550, which—as a result of the small size of smartwatch screen 690—presents the list in substantially reduced font size. The third app 530 reviews the third user's previous session data to determine that there is a high likelihood that this user requires assistance in reading smaller sized text. In response, the third app 530 selects the accessibility option that would most likely accommodate the third user's needs. In this case, the third app 530 initiates an audio playback of the list. An optional audio message 650 ("You made this list with a magnified view on a larger screen. Enabling audio playback . . . ") is played via smartwatch speaker 640. In FIG. 6B, the third user 510 is shown listening to the content of his to-do list as an audio playback 670 being read to him automatically by the third app 530 ("Today's list. Number one. Call Sarah back. Number two. Make doctor appointment. Number three. Verify . . . "). Thus, it can be appreciated that the proposed embodiments may be useful not just to those with physical disabilities generally, but those for whom those disabilities are dependent on the technology being used. In addition, in different embodiments, the system can be configured to 'remember' the previous sessions' accessibility data and apply accessibility tools as needed during future sessions.

Figure 7:
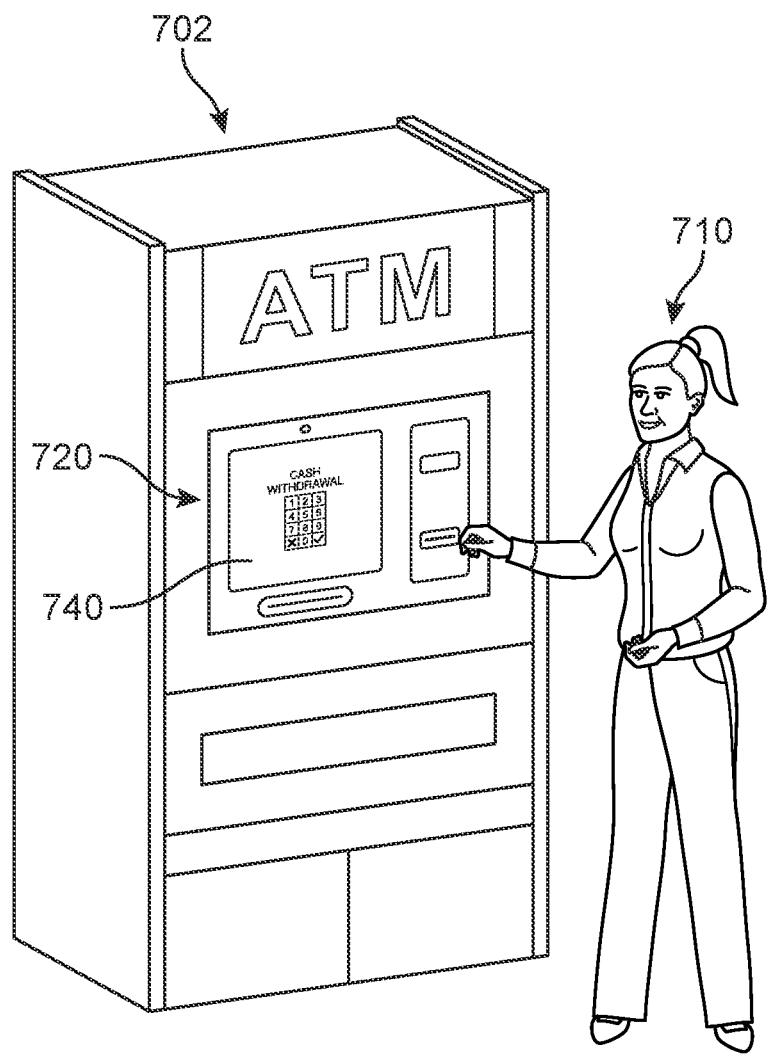
FIG. 7 is an illustration of a third user with a visual impairment approaching an automatic teller machine (ATM), according to an embodiment.
Figure 8B:
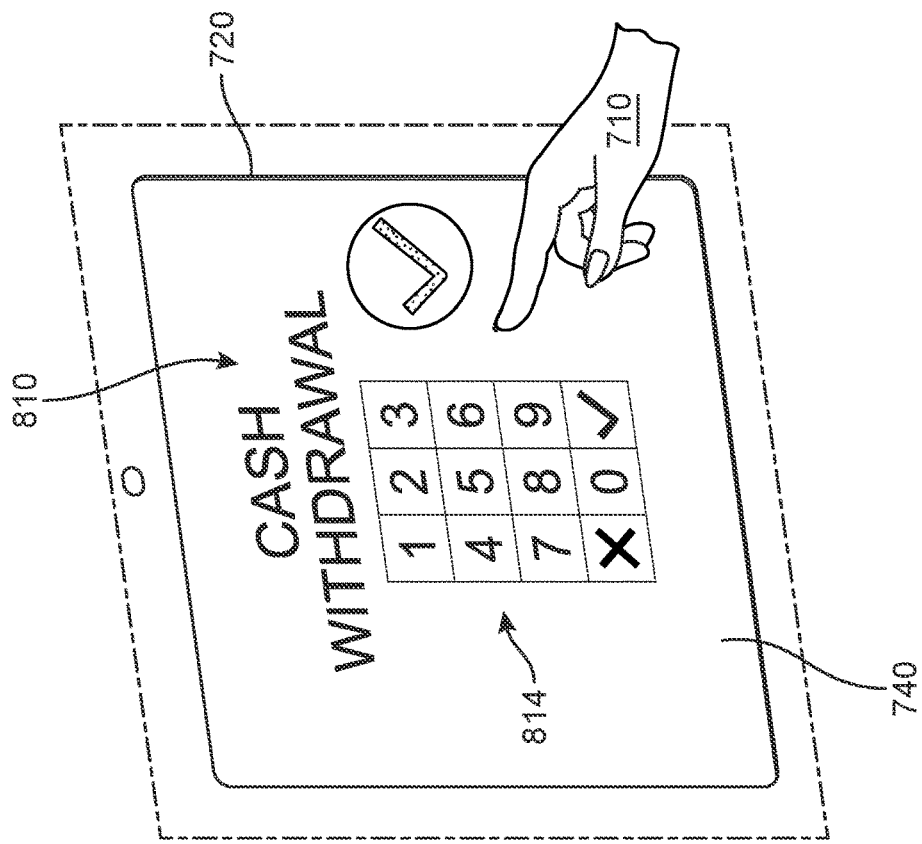
FIGS. 8A and 8B illustrate the third user repeatedly attempting to enter their PIN and being automatically provided with a magnification of the input interface, according to an embodiment.
Figure 8A:
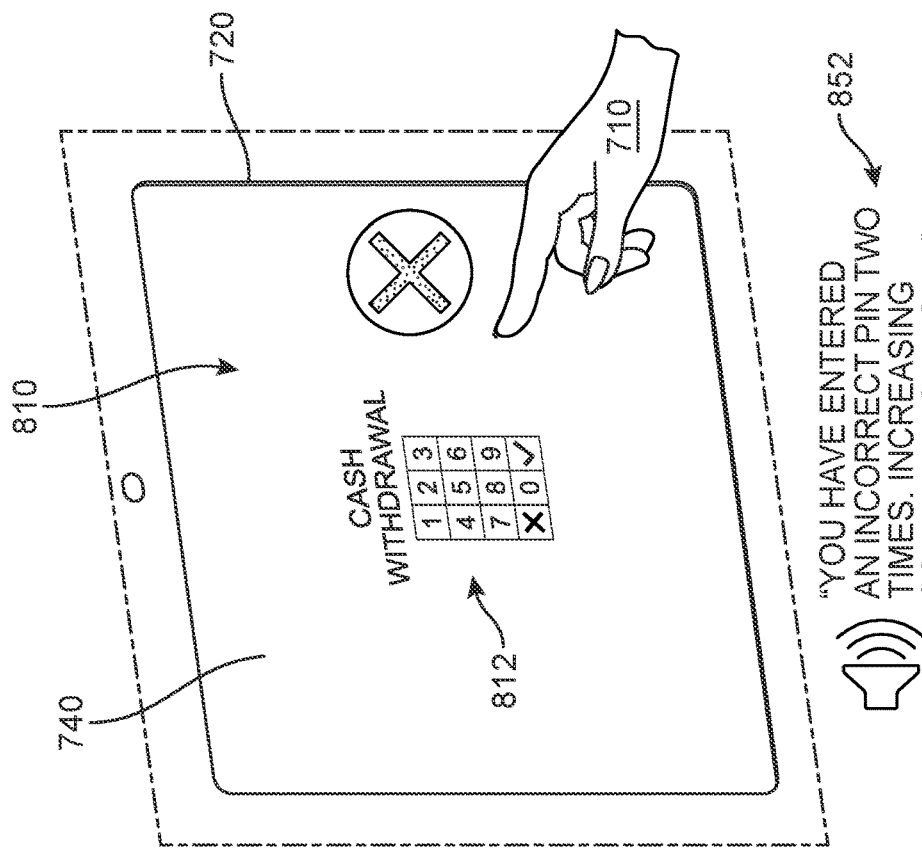

An additional example of a scenario in which an embodiment of the proposed systems may be implemented is shown with reference to FIGS. 7-8B. A fourth user 710 is shown accessing a fourth app 740 via a fourth computing device ("fourth device") 702, which in this case is an ATM machine. A display 720 for the ATM machine presents an interface for fourth app 740 that is configured to provide customers with access to their bank account. In FIG. 8A, the fourth user 710 is shown attempting to enter her personal identification number (PIN) into a cash withdrawal interface 810 of the fourth app 740. At this time, the elements of the cash withdrawal interface 810 is shown at a first magnification level 812. Unfortunately, fourth user 710 struggles with selecting the correct numbers at the first magnification level 812. In some embodiments, a camera associated with fourth device 702 can detect that the fourth user's hands are moving with a tremor or are otherwise unsteady.

The fourth app 740 receives this behavior as input data and determines that fourth user 710 may be visually impaired and/or have difficulty with fine motor control. In response, the fourth app 740 selects the accessibility option that would most likely accommodate the fourth user's needs. In this case, the fourth app 740 significantly increases the size of the interface elements to a second magnification level 814, as shown in FIG. 8B. An optional audio notification 852 ("You have entered an incorrect pin two times. Increasing screen magnification . . . ") is also played in FIG. 8A. As a result, in FIG. 8B, the fourth user 710 is shown now able to make the correct number selections. Thus, it can be appreciated that the proposed embodiments may be useful not just to those using their own personal devices, but for shared or common devices, for example those provided by businesses and other organizations.

Figure 9:
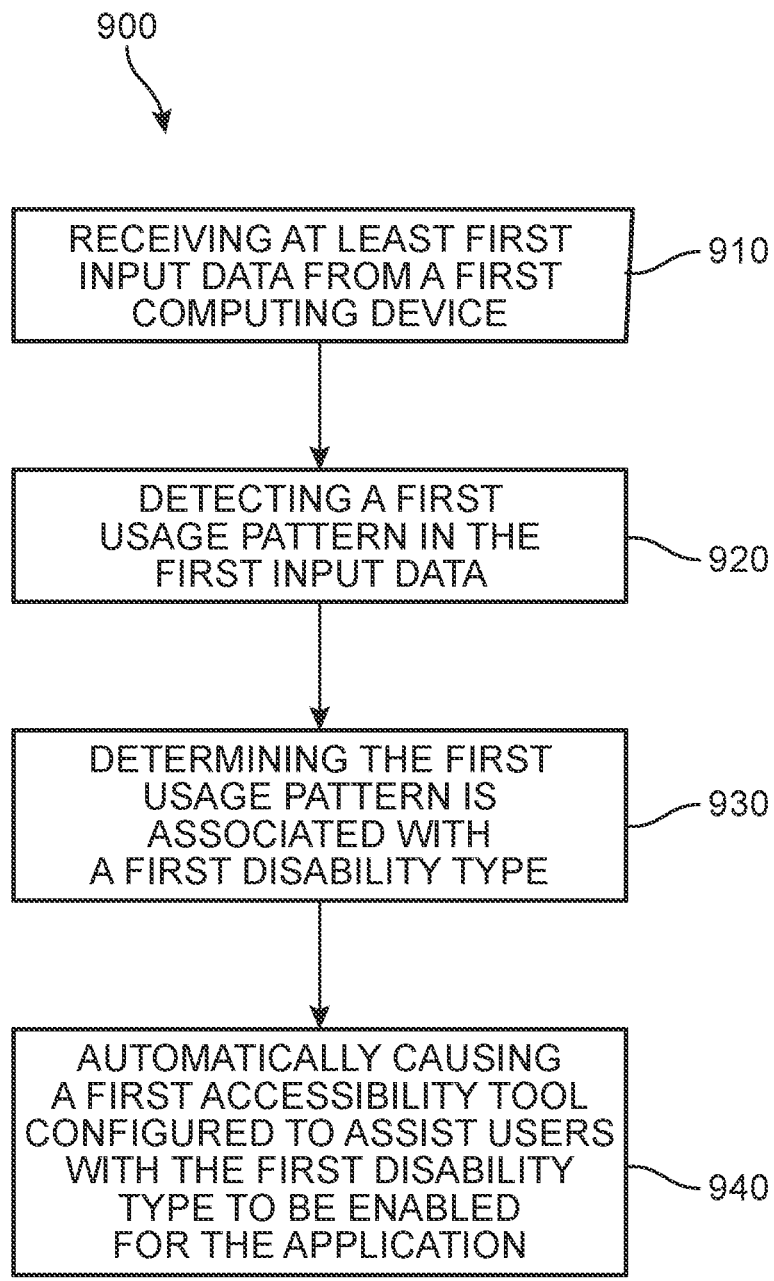
FIG. 9 is a flow diagram of a process for automatically enabling accessibility tools during use of an application in response to device data, according to an embodiment.

FIG. 9 is a flow chart illustrating an embodiment of a method 900 for automatically enabling accessibility tools during use of an application in response to device data. The method 900 includes a first step 910 of receiving, during an application usage session, at least first input data from a first computing device, and a second step 920 of detecting a first usage pattern in the first input data. In addition, the method 900 includes a third step 930 of determining the first usage pattern is associated with a first disability type, as well as a fourth step 940 of automatically causing, during the application access session, a first accessibility tool configured to assist users with the first disability type to be enabled for the application.

In other embodiments, the method may include additional steps or aspects. In one embodiment, the first input data is one of a sequence of mouse clicks and touchscreen taps. In another embodiment, the first accessibility tool causes audio playback of text being presented by the application to occur. In one example, the first accessibility tool causes closed captioning of audio being accessed through the application to be displayed. In another example, the first accessibility tool causes a magnification of elements of a user interface for the application. In other examples, the first accessibility tool causes an increase in the volume of audio being played by the application.

In some other embodiments, the method can also include steps of obtaining the first input data via a camera associated with the first computing device, and detecting a face of a user that is at a first distance from the camera. In this case, the first distance is significantly different than an average distance for a population of users of the application (e.g., a face that is within a few inches of the screen or a face that is at an arm's distance from the screen). In another embodiment, the method further includes a step of obtaining the first input data via a touchscreen associated with the first computing device. In this case, the first usage pattern is determined to be one associated with users experiencing hand tremors.

Other methods can also be contemplated within the scope of this disclosure. For example, a method for automatically providing an appropriate accessibility tool to a user of an application. The method includes a first step of obtaining at a first time, during an application usage session, at least first input data from a first computing device associated with a first user account. A second step includes determining the first input data includes use of a first accessibility tool during access of a first content via the application, and a third step includes receiving, at a second time subsequent to the first time, a request to access the application from a second computing device associated with the first user account. In addition, the method includes a fourth step of automatically enabling a second accessibility tool when the first content is again selected.

In different embodiments, this method may include additional steps or aspects. In one embodiment, the method also involves a step of storing the first input data in a database associated with the application. In some embodiments, the method further includes steps of receiving a request to access a second content via the application, determining a presentation type of the second content and the first content are substantially similar, and automatically enabling the first accessibility tool when the second content is presented. For purposes of this disclosure, a presentation type refers to the output mechanism and style by which the content is provided to the user. Examples of presentation types include, but are not limited to, text displayed on the screen, speech audio emitted by a speaker, non-speech audio emitted by a speaker, music emitted by a speaker, video playback on the screen, one or more images shown on the screen, text and images displayed on a screen, questions with input fields, etc. In another example, the first computing device and second computing device are different (e.g., one is a desktop and the other is a mobile phone). In some embodiments, the first accessibility tool and second accessibility tool differ (e.g., one is a screen brightness increase and the other is a text to speech function).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/ or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for automatically enabling accessibility tools during use of an application in response to device data representing user behavior, the method comprising:
   receiving, during a first application usage session, at least first input data from a first user of a first computing device;
   classifying, during the first application usage session, the first input data as corresponding to a first pattern of behavior, the first pattern of behavior referring to one or more of repeated undo usage, and repeated playback of audio or video;
   determining the first pattern of behavior is associated with a first disability type; and
   responsive to determining the first pattern of behavior is associated with the first disability type, automatically selecting and adjusting, during the first application access session, a first user experience setting for the application that is best configured to accommodate the first disability type.

2. The method of claim 1, wherein the first input data is one of a sequence of mouse clicks and touchscreen taps.

3. The method of claim 1, wherein the adjusted first user experience setting causes audio playback of text being presented by the application.

4. The method of claim 1, wherein the adjusted first user experience setting causes closed captioning of audio being accessed through the application to be displayed.

5. The method of claim 1, wherein the adjusted first user experience setting causes a magnification of elements of a user interface for the application.

6. The method of claim 1, wherein the adjusted first user experience setting causes an increase in the volume of audio being played by the application.

7. The method of claim 3, further comprising:
   obtaining the first input data via a camera associated with the first computing device; and
   detecting a face of a user that is at a first distance from the camera, the first distance being significantly different than an average distance for a population of users of the application.

8. The method of claim 1, further comprising:
   obtaining the first input data via a touchscreen associated with the first computing device; and
   wherein the first pattern of behavior is associated with users experiencing hand tremors.

9. A method of automatically providing an appropriate accessibility tool to a user of an application, the method comprising:
  obtaining at a first time, during an application usage session, at least first input data from a first user via one of a touchscreen and mouse for a first computing device;
  determining the first input data indicates an inability to distinguish certain color(s) by the first user; and
  responsive to determining an inability to distinguish certain color(s) by the first user, automatically adjusting a user experience setting for the application that includes one or more of an activation of a dictation tool, modification of contrast level, presentation of content in grayscale, change to colors of text, providing speech-based image descriptions, audio playback of text, and enabling closed captioning.

10. The method of claim 9, further comprising:
  receiving from the first user, at a second time subsequent to the first time, a request to access the application from a second computing device; and
  automatically adjusting the user experience setting at the second computing device to accommodate the inability to distinguish certain color(s).

11. The method of claim 10, wherein the adjustment to the user experience setting at the second computing device differs from the adjustment to the user experience setting at the first computing device.

12. The method of claim 9, wherein the first input data includes a pattern of inappropriate user selections of elements or regions that are a specific color range or hue.

13. A system for automatically enabling accessibility tools during use of an application in response to device data representing user behavior, the system comprising a processor and machine-readable media including instructions which, when executed by the processor, cause the processor to:
  receiving, during a first application usage session, at least first input data from a first user of a first computing device;
  classifying, during the first application usage session, the first input data as corresponding to a first pattern of behavior, the first pattern of behavior referring to one or more of repeated undo usage, and repeated playback of audio or video;
  determining the first pattern of behavior is associated with a first disability type; and
  responsive to determining the first pattern of behavior is associated with the first disability type, automatically selecting and adjusting, during the first application access session, a first user experience setting for the application that is best configured to accommodate the first disability type.

14. The system of claim 13, wherein the first input data is one of a sequence of mouse clicks and touchscreen taps.

15. The system of claim 13, wherein the adjusted first user experience setting causes audio playback of text being presented by the application.

16. The system of claim 13, wherein the adjusted first user experience setting causes closed captioning of audio being accessed through the application to be displayed.

17. The system of claim 13, wherein the adjusted first user experience setting causes a magnification of elements of a user interface for the application.

18. The system of claim 13, wherein the adjusted first user experience setting causes an increase in the volume of audio being played by the application.

19. The system of claim 15, wherein the instructions further cause the processor to obtain the first input data via a touchscreen associated with the first computing device, and wherein the first usage pattern is associated with users experiencing hand tremors.

20. The system of claim 13, wherein the instructions further cause the processor to obtain the first input data via a touchscreen associated with the first computing device, and the first pattern of behavior is associated with users experiencing hand tremors.

* * * * *